(12) United States Patent
Yoon

(10) Patent No.: US 8,079,041 B2
(45) Date of Patent: Dec. 13, 2011

(54) SPINDLE MOTOR AND CLAMPING APPARATUS

(75) Inventor: Ho Eop Yoon, Suwon-si (KR)

(73) Assignee: LG Innotek Co., Ltd., Seoul (KR)

( * ) Notice: Subject to any disclaimer, the term of this patent is extended or adjusted under 35 U.S.C. 154(b) by 584 days.

(21) Appl. No.: 12/255,879

(22) Filed: Oct. 22, 2008

(65) Prior Publication Data
US 2009/0106784 A1    Apr. 23, 2009

(30) Foreign Application Priority Data
Oct. 22, 2007 (KR) .......... 10-2007-0106041

(51) Int. Cl.
*G11B 17/03* (2006.01)

(52) U.S. Cl. ............ 720/706; 720/604; 720/713

(58) Field of Classification Search ............ 720/706, 720/604, 713, 695–696, 699
See application file for complete search history.

(56) References Cited

U.S. PATENT DOCUMENTS 7,343,610 B2 * 3/2008 Shibata .......... 720/713
7,856,642 B2 * 12/2010 Takaki et al. .......... 720/707
* cited by examiner

*Primary Examiner* — David Lam
(74) *Attorney, Agent, or Firm* — Saliwanchik, Lloyd & Eisenschenk

(57) ABSTRACT

Disclosed is a clamping apparatus including a case having a side surface on which a plurality of arm holes are formed; an arm, which moves inside and outside the case through one of the arm holes while being restricted by the case and has an upper part and a lower part that are guided by the case; and an elastic member installed inside the case to elastically support the arm.

18 Claims, 5 Drawing Sheets

SPINDLE MOTOR AND CLAMPING APPARATUS

CROSS-REFERENCE TO RELATED APPLICATION

The present application claims the benefit under 35 U.S.C. §119(e) of Korean Patent Application No. 10-2007-0106041, filed Oct. 22, 2007, which is hereby incorporated by reference in its entirety.

BACKGROUND

The embodiment relates to a spindle motor and a clamping apparatus.

The spindle motor is applied to various electronic devices. The spindle motor has a main function of rotating an optical disc to record data on the optical disc or read the data recorded from the optical disc.

The spindle motor is provided with a clamping apparatus for supporting the optical disc.

BRIEF SUMMARY

The embodiment provides a spindle motor having a novel structure.

The embodiment provides a clamping apparatus having a novel structure.

The embodiment provides a clamping apparatus for firmly supporting a disc and a spindle motor including the same.

The clamping apparatus according to the embodiment includes: a case having a side surface on which a plurality of arm holes are formed; an arm, which moves inside and outside the case through one of the arm holes while being restricted by the case and has an upper part and a lower part that are guided by the case; and an elastic member installed inside the case to elastically support the arm.

The clamping apparatus according to the embodiment includes: a case having a side surface on which a plurality of arm holes are formed; an arm, which moves inside and outside the case through the arm hole while being restricted by the case; and an elastic member installed inside the case to elastically support the arm, wherein, when the arm moves, an upper surface of the arm is slid while making contact with the case at a first distance from a center of the case and a lower surface of the arm is slide while making contact with the case at a second distance longer than the first distance.

The spindle motor according to the embodiment includes: a base; a bearing housing installed on the base; a bearing press-fitted into an inner circumference of the bearing housing; a rotary shaft, which is supported by the bearing and rotatably installed on the bearing; a stator including a core disposed around the bearing housing and a coil wound around the core; a rotor including a rotor yoke which is coupled to the rotary shaft and a magnet which is coupled to the rotor yoke to face the coil; and a clamping apparatus installed on the rotor yoke, wherein the clamping apparatus includes a case having a side surface on which a plurality of arm holes are formed; an arm that moves inside and outside the case through the arm hole by being restricted by the case and has an upper part and a lower part that are guided by the case; and an elastic member installed inside the case to elastically support the arm.

DETAILED DESCRIPTION

Hereinafter, a spindle motor according to the embodiment will be described in detail with reference to accompanying drawings.

Figure 1:
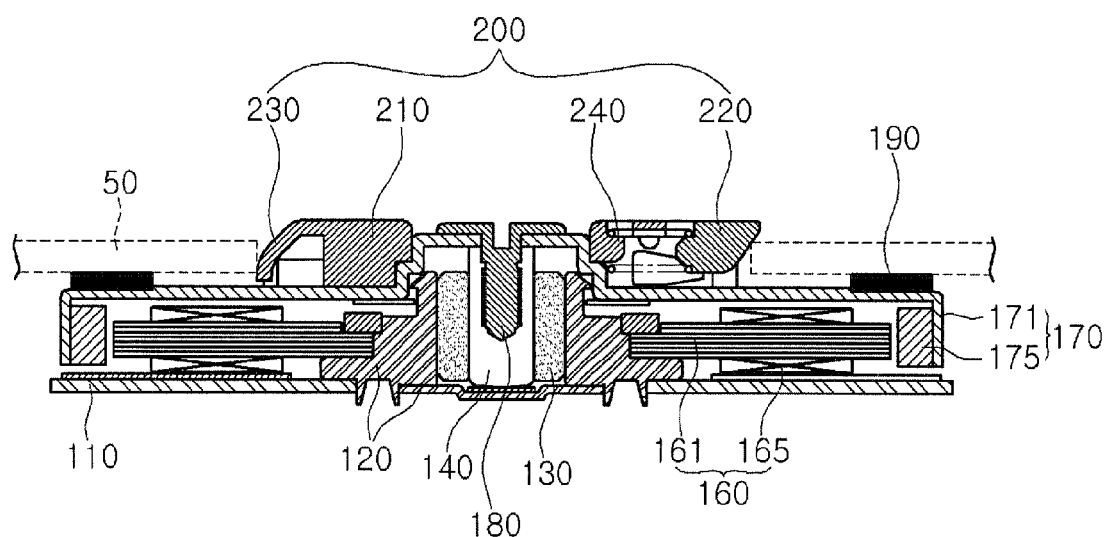
FIG. 1 is a sectional view representing a spindle motor adopting a clamping apparatus.

FIG. 1 is a sectional view representing a spindle motor adopting a clamping apparatus according to the embodiment.

As shown in FIG. 1, a bearing housing 120 having a cylindrical shape is vertically installed on a base 110. The bearing housing 120 has a cylindrical shape and includes an open upper side and a lower side fixed to the base 110.

A bearing 130 is press-fitted into an inner circumference of the bearing housing 120, and a lower side of a rotary shaft 140 is supported by the bearing 130 such that the rotary shaft 140 is rotatably installed.

A stator 160 is fixed to the bearing housing 120, and a rotor 170 is fixed to the rotary shaft 140. The stator 160 includes a core 161 fixed to an outer circumference of the bearing housing 120 and a coil 165 wound around the core 161. The rotor 170 includes a rotor yoke 171, which is coupled to the rotary shaft 140 and covers the stator 160, and a magnet 175, which is fixed to an inner circumference of the rotor yoke 171 to face the stator 160.

If current is applied to the coil 165, the rotor 170 is rotated by electromagnetic force generated between the coil 165 and the magnet 175 while being supported by the rotary shaft 140.

The rotary shaft 140 is coupled to the rotor yoke 171 by a fastening member 180. The fastening member 180 has a first part, which makes contact with an upper surface of the rotor yoke 171, and a second part inserted into the rotary shaft 140 such that the rotary shaft 140 is firmly coupled to the rotor yoke 171. Although not shown in the drawings, the rotor yoke 171 may be directly coupled to an outer circumference of the rotary shaft 140 through a press-fitting scheme without using the fastening member 180.

The rotor yoke 171 may serve as a turntable on which a disc 50 is loaded. A felt 190 is installed on the upper surface of the rotor yoke 171 to inhibit the disc 50 from being slid.

A clamping apparatus 200 for supporting the disc 50 loaded on the rotor yoke 171 is coupled to the rotor yoke 171 that is coupled to the rotary shaft 140.

The clamping apparatus 200 according to the embodiment firmly supports the disc 50. Hereinafter, the clamping apparatus 200 will be described with reference to FIGS. 2 and 3.

Figure 2:
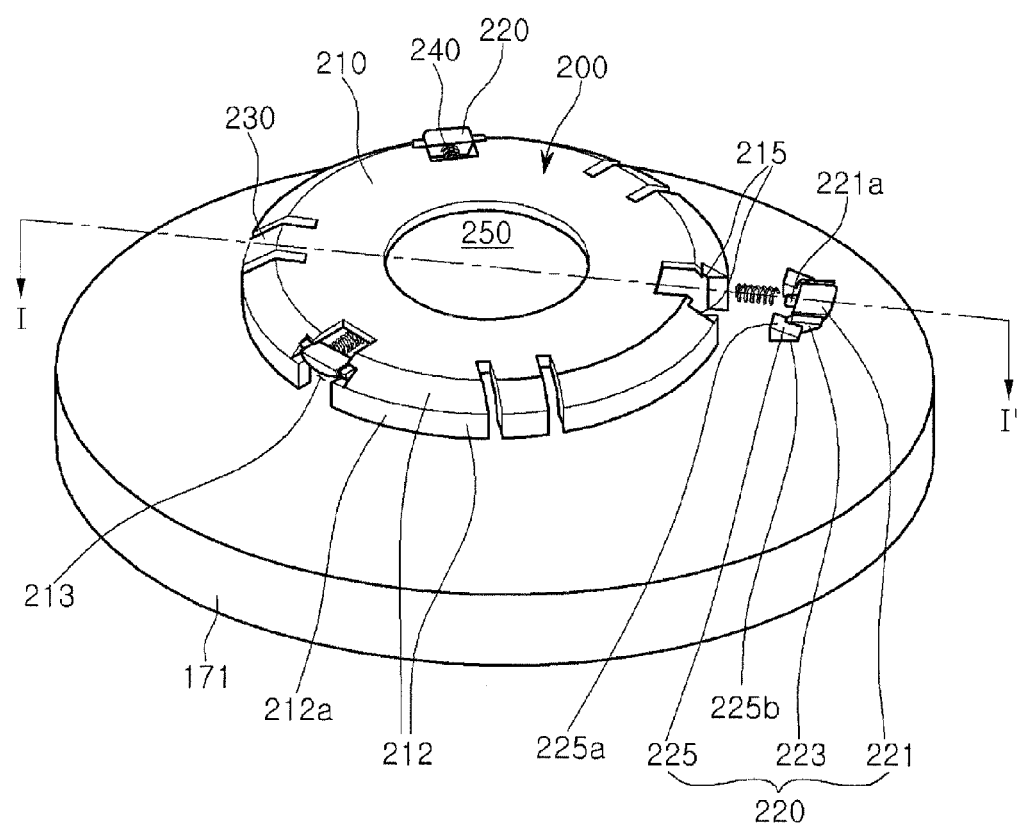
FIG. 2 is a partially exploded perspective view representing a rotor yoke and the clamping apparatus shown in FIG. 1.
Figure 3:
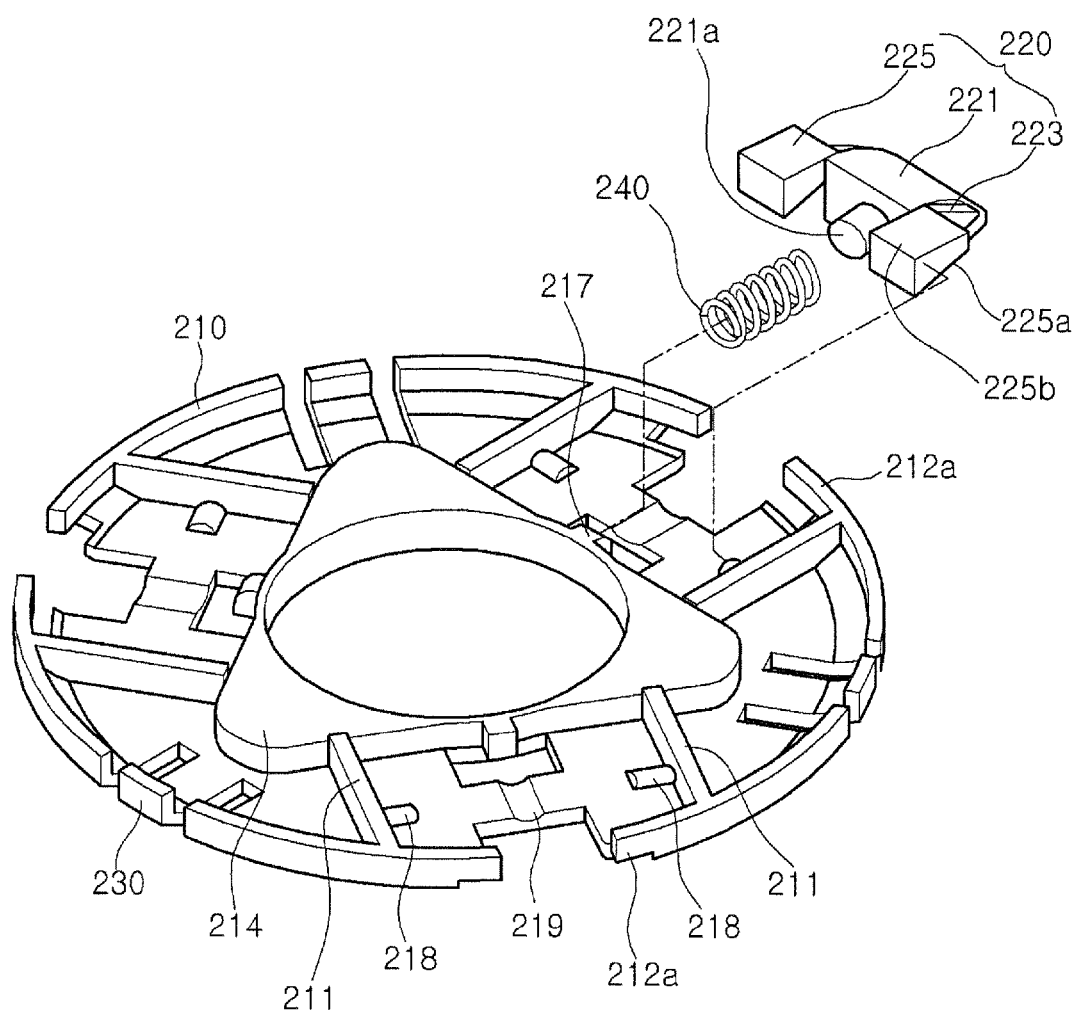
FIG. 3 is a bottom perspective view representing main components of the clamping apparatus shown in FIG. 2.

FIG. 2 is a partially exploded perspective view representing a rotor yoke and the clamping apparatus shown in FIG. 1, and FIG. 3 is a bottom perspective view representing main components of the clamping apparatus shown in FIG. 2.

As shown in FIGS. 2 and 3, the clamping apparatus 200 includes a case 210, an arm 220, a claw 230 and an elastic member 240.

The case 210 has a cylindrical shape, and includes a center part having a coupling hole 250, an open lower surface and a side surface 212 onto which the disc 50 is inserted (refer to FIG. 1).

The coupling hole 250 is press-fitted around an outer circumference of a center part of an upper surface of the rotor yoke 171 coupled to the rotary shaft 140 (see, FIG. 1) such that the case 210 is coupled to the rotor yoke 171. A part of the case 210 having the coupling hole 250 is thicker than the remaining part of the case 210 such that the case 210 is firmly coupled to the rotor yoke 171. In order to stably install the case 210, a lower surface of the case 210 makes contact with the upper surface of the rotor yoke 171.

A plurality of first arm holes 213 are formed at a side surface 212 of the case 210 along the circumference of the case 210. A second arm hole 215 is formed at both sides of the first arm hole 213 to widen the first arm hole 213.

The arm 220 moves into/out of the first and second arm holes 213 and 215 depending on the loading state of the disc 50.

The arm 220 includes a body 221, a guide rail 223 and an anti-separation rail 225.

The body has a first side disposed outside the side surface 212 of the case 210 and a second side disposed inside the case 210 such that a part of the body 221 moves into/out of the first arm hole 213.

A first end of the body makes contact with an inner circumference of the disc 50. As the disc 50 makes contact with the body 221, the body 221 moves inside and outside the side surface 212 of the case 210 in a pendulum motion. That is, the body 221 moves radially outward and inward about the rotary shaft 140. If the disc 50 is completely inserted onto the side surface 212 of the case 210 to be loaded on the rotor yoke 171, an upper edge of the inner circumference of the disc 50 is locked with the first end of the body 221, thereby inhibiting the disc 50 from being separated in the upward direction.

A lower part of the first end of the body 221 is rounded while getting closer to the center of the case 210 as the lower part goes downward. Accordingly, the body 221 smoothly rotates when the disc 50 is loaded or unloaded.

The guide rail 223 is formed at both side surfaces of the body 221 to move into/out of the second arm hole 215. The guide rail 223 and the second arm hole 215 allow the arm 220 to move into/out of the second arm hole 215 while smoothly rotating when the body 221 moves inside and outside the side surface 212 of the case 210.

A lower part of a first end of the guide rail 223 has an inclined surface, which is getting closer to the center of the case 210 as the inclined surface goes downward. Accordingly, when the disc 50 is inserted, if the body 221 is pressed downward by the disc 50, a lower inclined surface of the guide rail 223 is slid while making contact with a projection 212a of the case 210, which defines the second arm hole 215, thereby guiding the body 221 to the inside of the case 210.

The anti-separation rail 225 extends from the guide rail 223. Otherwise, the anti-separation rail 225 may extend from the body 221. A thickness of the anti-separation rail 225 is inversely proportional to a distance thereof relative to the center of the case 210.

The anti-separation rail 225 is disposed inside the case 210, and has a side surface making contact with a rib 211 of the case 210. Accordingly, the arm 220 is inhibited from being shaken inside the case 210 due to the anti-separation rail 225.

In addition, the first end of the anti-separation rail 225 is inhibited from moving radially outward by the projection 212a of the case 210. Accordingly, the arm 220 is inhibited from being separated out of the side surface 212 of the case 210.

The body 221, the guide rail 223 and the anti-separation rail 225 are integrally formed.

A plurality of claws 230 are integrally formed with the case 210 at the side surface 212 of the case 210. The claws 230 and the first arm holes 213 are alternately disposed in the circumferential direction about the center of the case 210.

The claw 230 supports the disc 50 such that the center of the disc 50 inserted onto the case 210 matches with the center of the rotary shaft 140.

The elastic member 240 is installed inside the case 210 to elastically support the arm 220 radially outward of the case 210 such that the arm 220 firmly supports the disc 50. In this case, a first side and a second side of the elastic member 240 are supported by a first support protrusion 221a, which is formed at the first end of the body 221 of the arm 220, and a second support protrusion 217, which is formed inside the case 210 in opposition to the first support protrusion 221a, respectively.

In order to firmly install the elastic member 240, a groove shaped mounting path 219, on which the elastic member 240 is mounted, is formed at an upper surface of the case 210.

As the disc 50 is inserted onto the case 210 to be loaded on the rotor yoke 171, the arm 220 moves inside/outside the side surface 212 of the case 210 while rotating in the pendulum motion.

Meanwhile, when the arm 220 moves inside and outside the surface 212 of the case 210, the motion of the arm 220 must be restricted within a predetermined range.

For example, when the arm 220 rotates beyond a predetermined angle, elastic force of the elastic member 240 may not be properly applied to the arm 220 or the arm 220 fails to return to the original position suitable for precisely supporting the disc 50.

Accordingly, the clamping apparatus according to the embodiment restricts the motion of the arm 220.

A contact protrusion 218 for restricting the motion of the anti-separation rail 225 is formed inside the case 210.

The contact protrusion 218 protrudes downward from the case 210, that is, toward the rotor yoke 171, to make contact with an upper surface of the anti-separation rail 225.

The contact protrusion 218 has a hemispherical cross section and extends in a direction perpendicular to a direction of the motion of the anti-separation rail 225. Accordingly, the contact protrusion 218 comes in line contact with the anti-separation rail 225.

The anti-separation rail 225 has a first inclined surface 225a, which is lowered as the first inclination surface 225a goes radially outward of the case 210. That is, the first inclined surface 225a is getting closer to the rotor yoke 171, as the first inclination surface 225a goes radially outward of the case 210.

As the first inclination surface 225a makes contact with the contact protrusion 218, the motion of the arm 220 is guided.

Accordingly, if the first end of the arm 220 moves downward and a second end of the arm 220 moves upward, the anti-separation rail 225 is guided by the contact protrusion 218, so that the motion of the arm 220 is restricted. As a result, the deflection in motion of the arm 220 is reduced, so that the arm 220 can support the disc 50 at a precise position.

For the smooth motion of the arm 220, the contact protrusion 218 is rounded in the movement direction of the arm 220.

If the first inclination surface 225a of the anti-separation rail 225 has a shape that rises toward the center of the case 210, the first end of the arm 220 is more lowered downward and the second end of the arm 220 more rises upward due to the contact between the contact protrusion 218 and the anti-separation rail 225. Accordingly, the first inclination surface 225a of the first inclination surface 225a is lowered toward the outside of the case 210. In addition, the first inclination surface 225a of the anti-separation rail 225 has a flat surface or a concavely curved surface.

In addition, a lower surface of the anti-separation rail 225, which is formed in opposition to the rotor yoke 171, has a second inclined surface 225b. The second inclined surface 225b rises radially outward of the case 210. That is, the second inclined surface 225b is remote from the rotor yoke 171 as the second inclination surface 225b goes toward the outside of the case 210. Accordingly, the arm 220 is inhibited from making contact with the upper surface of the rotor yoke 171 during the movement of the arm 220.

Figure 4:
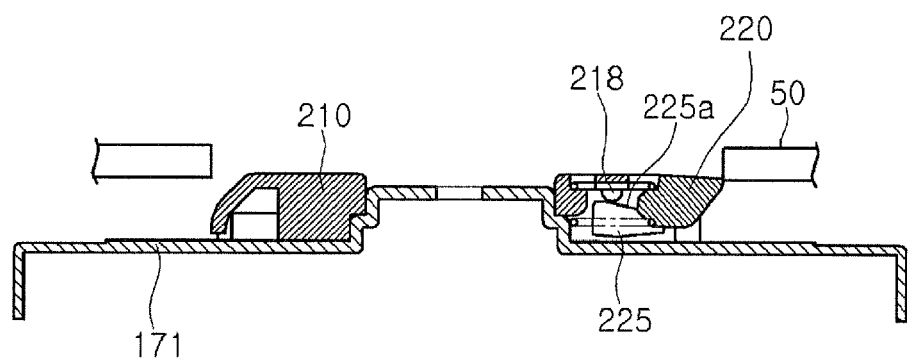
FIGS. 4-6 are views showing an operation of the clamping apparatus according to the embodiment.
Figure 6:
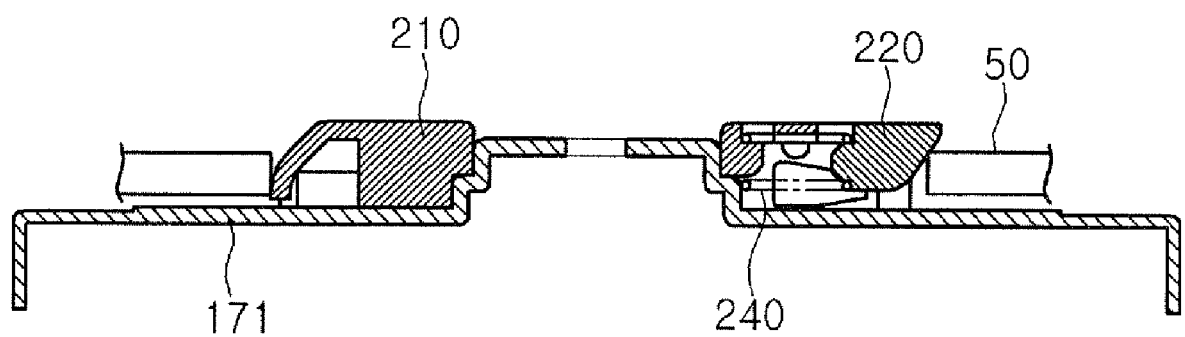

Hereinafter, an operation of the clamping apparatus 220 according to the embodiment will be described with reference to the FIGS. 4 and 6. FIGS. 4 and 6 are sectional views taken along line I-I' of FIG. 2.

As shown in FIG. 4, if the disc 50 is pressed toward the rotor yoke 171 in a state that an inner circumference of the disc 50 is disposed in opposition to the side surface 212 of the case 210, an upper side of a first end of the arm 220, which protrudes to the outside of the case 210, is pressed by a lower edge of the inner circumference of the disc 50.

As a result, the arm 220 rotates in such a manner that a first end side of the arm 220 is lowered and a second end side of the arm 220 rises. However, the first inclined surface 225a of the anti-separation rail 225 of the arm 220 makes contact with the contact protrusion 218 formed on the case 210, thereby inhibiting the arm 220 from rotating beyond a predetermined angle.

Figure 5:
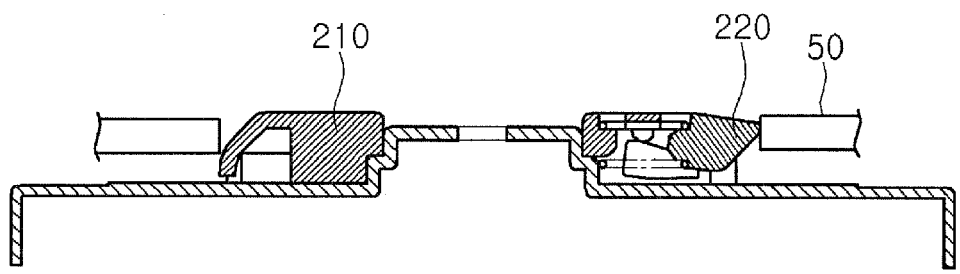

After that, if the disc 50 is more pressed downward, as shown in FIG. 5, the first end of the arm 220 makes contact with the inner circumference of the disc 50. As a result, the arm 220 moves backward into the case 210 while maintaining the rotated state.

Then, the disc 50 is further pressured to be loaded on the rotor yoke 171, as shown in FIG. 6, the arm 220 returns to the original position of the elastic member 240 by the elastic force. Thus, an upper edge of the inner circumference of the disc 50 is locked with the first end of the arm 220, thereby inhibiting the disc 50 from being separated from the case 210. In this case, the motion of the arm 220 is restricted and the arm 220 rotates within a predetermined range, so that arm 220 returns to the precise position.

As described above, according to the clamping apparatus 200 of the spindle motor of the embodiment, the motion of the arm 220 for supporting the disc 50 is restricted such that the arm 220 can firmly support the disc 50 at a precise position.

Thus, the reliability of the spindle motor is improved.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A clamping apparatus comprising:
a case having a side surface on which a plurality of arm holes are formed;
an arm, which moves inside and outside the case through one of the arm holes while being restricted by the case and has an upper part and a lower part that are guided by the case; and
an elastic member installed inside the case to elastically support the arm,
wherein the arm comprises:
a body, which has a first end disposed at an outside of the case and a second end disposed at an inside of the case,
a guide rail, which is formed at both sides of the body such that a motion of a lower part of the guide rail is guided by the case, and
an anti-separation rail, which is formed at the both sides of the body such that a motion of an upper part of the anti-separation rail is guided by the case.

2. The clamping apparatus according to claim 1, wherein the body, the guide rail and the anti-separation rail are integrally formed.

3. The clamping apparatus according to claim 1, wherein the case has a contact protrusion, which protrudes downward from the inside of the case to guide a motion of the anti-separation rail.

4. The clamping apparatus according to claim 3, wherein the contact protrusion comes into a line contact with the anti-separation rail.

5. The clamping apparatus according to claim 3, wherein the contact protrusion has a hemispherical cross section and extends in a direction perpendicular to a direction of motion of the anti-separation rail.

6. The clamping apparatus according to claim 1, wherein the anti-separation rail has an upper surface, which is inclined in such a manner that the upper surface is lowered as the upper surface goes to the outside of the case.

7. The clamping apparatus according to claim 1, wherein the anti-separation rail has a lower surface, which is inclined in such a manner that the lower surface rises as the lower surface goes to the outside of the case.

8. The clamping apparatus according to claim 1, wherein a motion of the anti-separation rail is restricted by the case when the anti-separation rail moves out of the case.

9. The clamping apparatus according to claim 1, further comprising a plurality of claws that are formed at the side surface of the case while being alternately disposed with the arm holes.

10. A clamping apparatus comprising:
a case having a side surface on which a plurality of arm holes are formed;
an arm, which moves inside and outside the case through one of the arm holes while being restricted by the case; and
an elastic member installed inside the case to elastically support the arm,
wherein, when the arm moves, an upper surface of the arm is slid while making contact with the case at a first distance from a center of the case and a lower surface of the arm is slid while making contact with the case at a second distance longer than the first distance,
wherein the arm comprises:
a body, which has a first end disposed at an outside of the case and a second end disposed at an inside of the case,
a guide rail, which is formed at both sides of the body such that a motion of a lower part of the guide rail is guided by the case at the second distance, and an anti-separation rail, which is formed at the both sides of the body such that a motion of an upper part of the anti-separation rail is guided by the case at the first distance.

11. The clamping apparatus according to claim 10, wherein the body, the guide rail and the anti-separation rail are integrally formed.

12. The clamping apparatus according to claim 10, wherein the case has a contact protrusion, which protrudes downward from the inside of the case to guide a motion of the anti-separation rail.

13. The clamping apparatus according to claim 12, wherein the contact protrusion has a curved surface.

14. The clamping apparatus according to claim 10, wherein a thickness of the anti-separation rail is inversely-proportional to a distance thereof relative to a center of the case.

15. The clamping apparatus according to claim 10, further comprising a plurality of claws that are formed at the side surface of the case while being alternately disposed with the arm holes.

16. A spindle motor comprising:
a base;
a bearing housing installed on the base;
a bearing press-fitted into an inner circumference of the bearing housing;
a rotary shaft, which is supported by the bearing and rotatably installed on the bearing;
a stator including a core disposed around the bearing housing and a coil wound around the core;
a rotor including a rotor yoke which is coupled to the rotary shaft and a magnet which is coupled to the rotor yoke to face the coil; and
a clamping apparatus installed on the rotor yoke,
wherein the clamping apparatus comprises:
a case having a side surface on which a plurality of arm holes are formed;
an arm which moves inside and outside the case through one of the arm holes by being restricted by the case and has an upper part and a lower part that are guided by the case; and
an elastic member installed inside the case to elastically support the arm.

17. The spindle motor according to claim 16, further comprising a fastening member, which comes into contact with an upper surface of the rotor yoke and is inserted into the rotary shaft such that the rotor yoke is coupled to the rotary shaft.

18. The spindle motor according to claim 16, wherein the arm comprises:
a body, which has a first end disposed at an outside of the case and a second end disposed at an inside of the case,
a guide rail, which is formed at both sides of the body such that a motion of a lower part of the guide rail is guided by the case, and
an anti-separation rail, which is formed at the both sides of the body such that a motion of an upper part of the anti-separation rail is guided by the case.

* * * * *